(12) United States Patent
Yamamoto et al.

(10) Patent No.: US 9,157,650 B2
(45) Date of Patent: Oct. 13, 2015

(54) HEAT SOURCE APPARATUS

(75) Inventors: Manabu Yamamoto, Fuji (JP); Kunio Muroi, Fuji (JP); Yuuji Matsumoto, Fuji (JP)

(73) Assignee: Toshiba Carrier Corporation, Fuji-shi (JP)

( * ) Notice: Subject to any disclaimer, the term of this patent is extended or adjusted under 35 U.S.C. 154(b) by 363 days.

(21) Appl. No.: 13/879,362

(22) PCT Filed: Oct. 11, 2011

(86) PCT No.: PCT/JP2011/073337
§ 371 (c)(1),
(2), (4) Date: Apr. 12, 2013

(87) PCT Pub. No.: WO2012/050087
PCT Pub. Date: Apr. 19, 2012

(65) Prior Publication Data
US 2013/0219936 A1    Aug. 29, 2013

(30) Foreign Application Priority Data

Oct. 15, 2010   (JP) ................................. 2010-232048

(51) Int. Cl.
*F24F 11/02* (2006.01)
*F24D 19/10* (2006.01)
*F25B 25/00* (2006.01)
*F25B 13/00* (2006.01)

(52) U.S. Cl.
CPC ............ *F24F 11/02* (2013.01); *F24D 19/1006* (2013.01); *F25B 25/005* (2013.01); *F25B 13/00* (2013.01); *F25B 2600/13* (2013.01); *Y02B 30/745* (2013.01)

(58) Field of Classification Search
CPC .... F25B 13/00; F25B 25/003; F25B 2600/13; F25B 2700/21161; F25B 2700/21171; F25B 2700/21172; F25B 2700/21173; F24F 11/02; F24D 19/1006; Y02B 30/745
USPC ........................................... 62/180, 185, 201
See application file for complete search history.

(56) References Cited

U.S. PATENT DOCUMENTS 4,161,106 A * 7/1979 Savage et al. .................... 62/115
5,419,146 A * 5/1995 Sibik et al. ....................... 62/115
(Continued)

FOREIGN PATENT DOCUMENTS

JP    57-075364    5/1982
JP    63-163725    7/1988
(Continued)

OTHER PUBLICATIONS

English Language Abstract and Translation for JP 2006-275397 published Oct. 12, 2006.
(Continued)

*Primary Examiner* — Marc Norman
(74) *Attorney, Agent, or Firm* — DLA Piper LLP (US)

(57) ABSTRACT

A heat source apparatus of a heat source system made up of a heat source machine side and a load facility side includes a heat source machine, and a heat source controller, wherein the heat source machine includes: a water heat exchanger that exchanges heat between heat source water and a refrigerant circulating through a refrigeration cycle; a primary pump that delivers heat source water to the water heat exchanger; and a heat source machine control device that operates based on information from the water heat exchanger and the primary pump, and wherein the heat source controller is connected to the heat source machine control device on a heat source side and to the load facility side so as to determine, after the primary pump is activated, whether or not the heat source water is normally fed by the primary pump based on a temperature difference between the heat source water before and after the water heat exchanger or a pressure difference between the heat source water before and after the water heat exchanger, and so as to then operate the refrigeration cycle after water feed is confirmed through water feed determination.

4 Claims, 4 Drawing Sheets

(56) References Cited

U.S. PATENT DOCUMENTS

| | | | |
|---|---|---|---|
| 5,539,382 A * | 7/1996 | Duff et al. | 340/585 |
| 6,467,289 B2 * | 10/2002 | Kuroki et al. | 62/201 |
| 2002/0014085 A1 * | 2/2002 | Sakakibara et al. | 62/201 |
| 2003/0061827 A1 * | 4/2003 | Sakakibara | 62/224 |
| 2010/0205987 A1 * | 8/2010 | Okazaki et al. | 62/190 |

FOREIGN PATENT DOCUMENTS

| | | |
|---|---|---|
| JP | 10-078266 | 3/1998 |
| JP | 2003-050067 | 2/2003 |
| JP | 2005-155973 | 6/2005 |
| JP | 2006-275397 | 10/2006 |
| JP | 2009-036485 | 2/2009 |

OTHER PUBLICATIONS

International Search Report issued in PCT/JP2011/073337 dated Jan. 5, 2012.

English Language Translation for International Search Report issued in PCT/JP2011/073337 dated Jan. 5, 2012.

Written Opinion of International Searching Authority issued in PCT/JP2011/073337 dated Jan. 5, 2012.

English Language Translation for International Preliminary Report on Patentability and Written Opinion of International Searching Authority issued in PCT/JP2011/073337 dated Jan. 5, 2012.

English Language Abstract of JP 63-163725 published Jul. 7, 1988.

English Language Abstract and Translation of JP 2005-155973 published Jun. 16, 2005.

English Language Abstract and Translation of JP 2003-050067 published on Feb. 21, 2003.

English Language Abstract and Translation of JP 10-078266 published Mar. 24, 1998.

English Language Abstract and Translation of JP 2009-036485 published on Feb. 19, 2009.

* cited by examiner

HEAT SOURCE APPARATUS

CROSS REFERENCE TO RELATED APPLICATIONS

This application is a U.S. National Stage Application of International Application No. PCT/JP2011/073337 filed Oct. 11, 2011, which claims priority from Japanese Patent Application No. 2010/232048 filed Oct. 15, 2010.

TECHNICAL FIELD

An embodiment of the present invention relates to a heat source apparatus in a heat source system made up of a heat source machine side and a load facility side, and more particularly, relates to a heat source apparatus that generates cold water or warm water under control.

BACKGROUND ART

Conventionally, in a case where, for example, a plurality of indoor units (fan coil units) are placed at such places as large-scale plants and buildings, a heat source system is utilized which supplies heat source water (cold water or warm water) from a heat source machine to these indoor units so as to air condition a plurality of air conditioning areas.

The heat source system is mainly divided into a heat source machine side and a load facility side (indoor unit side), and these sides are connected through a delivery pipe, which supplies heat source water from a heat source machine to a load facility, and through a return pipe, which returns the heat source water to the heat source machine via the load facility, thus constituting one circuit.

For example, the heat source water that is made to exchange heat inside the heat source machine passes through the delivery pipe and is delivered to the load facility by a load-side secondary pump. The heat source water is then made to exchange heat inside the load facility and is sent to a primary pump of the heat source machine through the return pipe. The heat source water sent to the primary pump passes through the inside of the heat source machine again and circulates inside the circuit.

During such operation, if the heat source machine is operated while water is not normally fed by the primary pump due to some sort of failures, the heat source water residing inside a heat exchanger of the heat source machine may be cooled and frozen, as a result of which the heat exchanger may freeze and burst.

Accordingly, the heat source machine is equipped with a flowmeter for measuring a flow rate of heat source water so that a flow of the heat source water is detected with the flowmeter.

PRIOR ART DOCUMENT

Patent Document

Patent Document 1: Japanese Patent Laid-Open No. 2006-275397

CONCEPT OF THE INVENTION

Problems to be Solved by the Invention

However, installing the flowmeter entails installation costs. In addition, as the heat source system is upsized, a larger flowmeter is required, and installation of the expensive flowmeter causes increase in cost of the heat source machine.

The present embodiment has been made in order to solve the problems described above, and an object of the present embodiment is to provide a heat source apparatus having a control unit capable of appropriately determining whether or not water is normally fed by a primary pump without installation of a flowmeter.

Means for Solving the Problems

A heat source apparatus of a heat source system made up of a heat source machine side and a load facility side is provided, which comprises: a heat source machine; and a heat source controller, wherein the heat source machine includes: a water heat exchanger that exchanges heat between heat source water and a refrigerant circulating through a refrigeration cycle; a primary pump that delivers heat source water to the water heat exchanger; and a heat source machine control device that operates based on information from the water heat exchanger and the primary pump, and wherein the heat source controller is connected to the heat source machine control device on a heat source side and to the load facility side to determine, after the primary pump is activated, whether or not the heat source water is normally fed by the primary pump based on a temperature difference between the heat source water before and after the water heat exchanger or a pressure difference between the heat source water before and after the water heat exchanger, and to operate the refrigeration cycle after water feed is confirmed through water feed determination.

It may be preferred that the heat source controller includes: a temperature difference calculation unit that obtains an inlet-side temperature and an outlet-side temperature of the heat source water from the heat source machine control device of the heat source machine and calculates a temperature difference therebetween; a water feed determination unit that compares the temperature difference with a set value prestored in the heat source controller and determines whether or not the heat source water is normally fed by the primary pump; and a cold/warm water generation unit that operates a refrigeration cycle of the heat source machine, which is determined by the water feed determination unit to have normal water feed by the primary pump, so as to generate cold water or warm water.

MODE FOR CARRYING OUT THE INVENTION

One embodiment of the present invention will be described hereinafter with reference to FIGS. 1 to 4.

Figure 1:
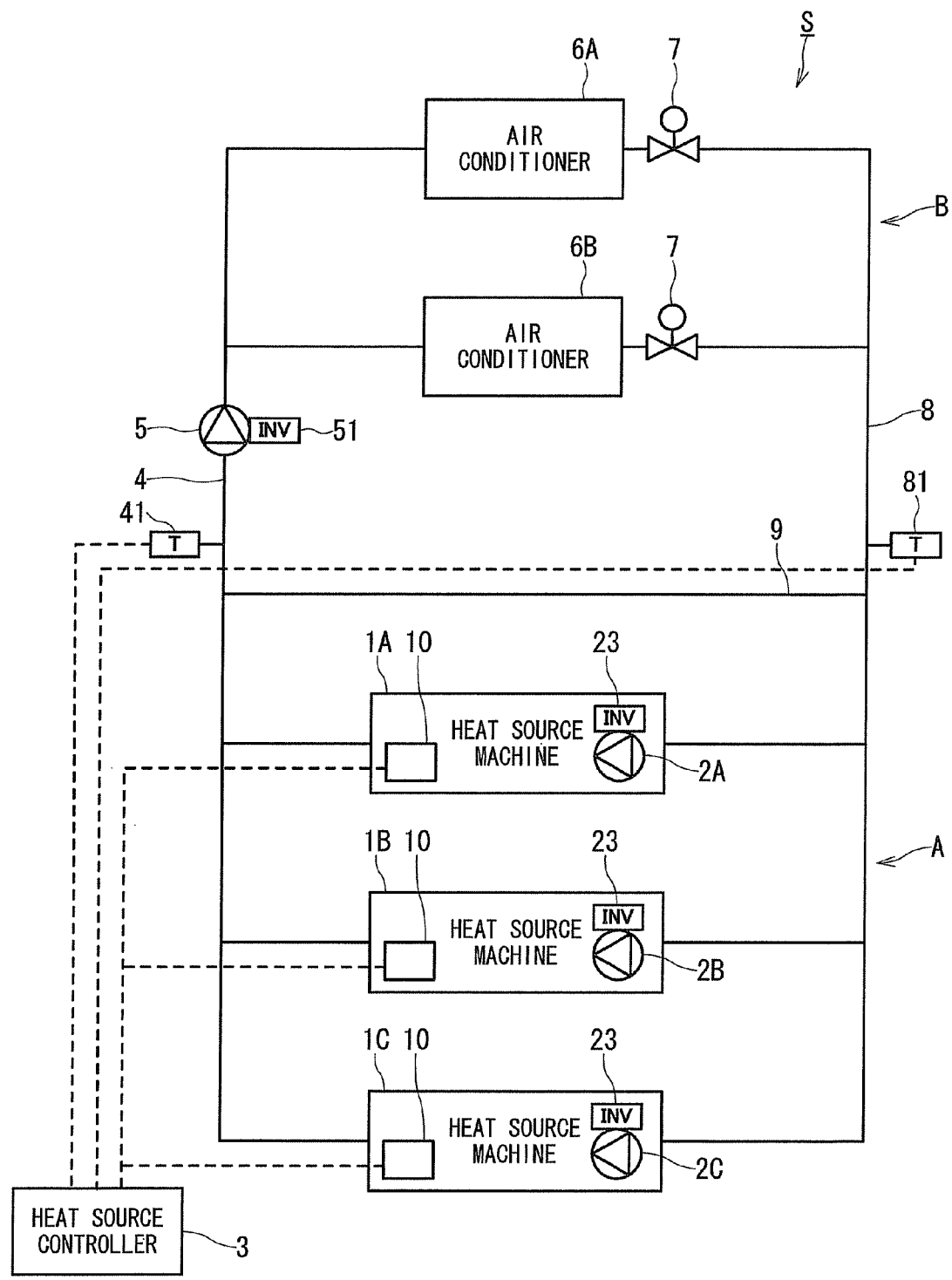
FIG. 1 is a view showing an overall configuration of a heat source system including a heat source apparatus according to one embodiment of the present invention.

As shown in FIG. 1, a heat source system S of the present embodiment is made up of a heat source machine side A and a load facility side B for use in air conditioning equipment that air conditions large-scale buildings, plants or the like and in hot-water supply equipment for warm swimming pools or the like.

In the present embodiment, a description is given of the case where heat source machines 1A-1C on the heat source machine side A are air-cooler heat pump chiller units while devices on the load facility side B are fan coils (air conditioners).

Provided on the heat source machine side A are: three heat source machines 1A, 1B, and 1C that generate heat source water; primary pumps 2A, 2B and 2C that supply heat source water to each of the heat source machines 1A-1C; and a heat source controller 3 that is a control section adapted to comprehensively control operation of these devices, and these devices constitute a heat source apparatus.

Figure 2:
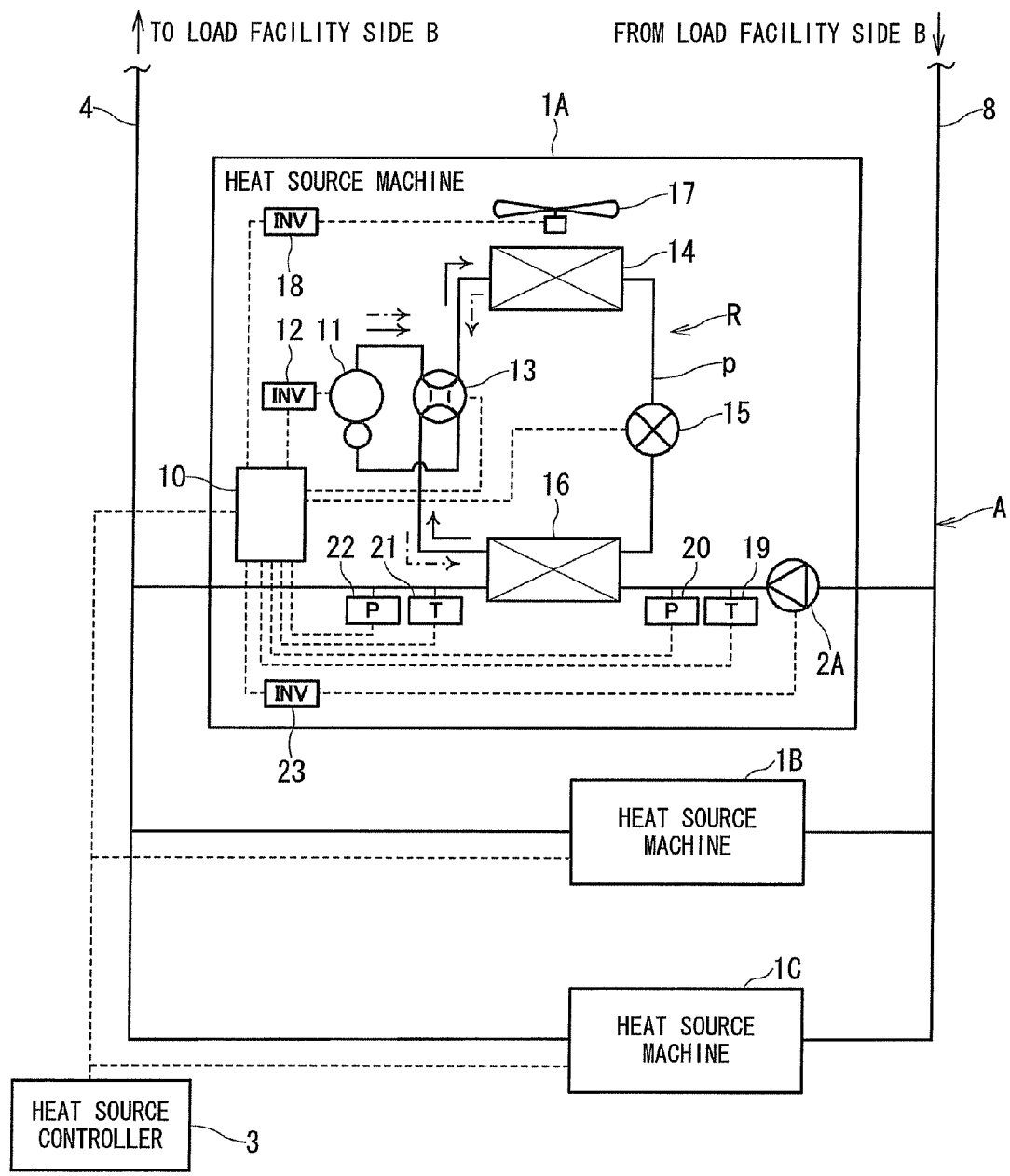
FIG. 2 is a view showing a refrigeration cycle of the heat source apparatus according to the embodiment.

FIG. 2 is a view showing a refrigeration cycle and a configuration of the heat source machines 1A-1C. Since the heat source machines 1B and 1C have the same configuration as the heat source machine 1A, their illustrations are omitted in FIG. 2.

As shown in FIG. 2, each of the heat source machines 1A-1C includes a compressor 11, a four way valve 13, a first heat exchanger (air heat exchanger) 14, an electric expansion valve 15, and a second heat exchanger (water heat exchanger) 16, which are connected to each other through a refrigerant pipeline p to thereby constitute a refrigeration cycle R. The refrigerant pipeline p is filled with a refrigerant, which circulates through the refrigeration cycle R.

Each of the heat source machines also includes a later-described heat source machine control device 10, which is connected to the heat source controller 3.

The compressor 11 in each of the heat source machines 1A-1C is connected to a compressor inverter 12, so that each of the heat source machines 1A-1C is operated at adjustable speed by the compressor inverter 12.

The primary pumps 2A-2C are respectively provided on a heat source water inlet side of the water heat exchanger 16 in each of the heat source machines 1A-1C.

The primary pumps 2A-2C are respectively built in the heat source machines 1A-1C and are also connected to respective primary pump inverters 23. In response to instructions from the heat source controller 3, each of the primary pumps 2A-2C is operated at variable speed by each of the primary pump inverters 23 via each of the heat source machine control devices 10. It is to be noted that the primary pumps 2A-2C to be used have identical specifications (input-flow rate characteristics).

In the vicinity of the air heat exchanger 14 in each of the heat source machines 1A-1C, a fan 17 for sending air to the air heat exchanger 14 is provided. Each of the fans 17 is connected to a fan inverter 18, so that the fan 17 is operated at variable speed by the fan inverter 18.

In the vicinity of a heat source water inlet of the water heat exchanger 16 in each of the heat source machines 1A-1C, there are provided an inlet-side water temperature sensor 19 that measures an inlet-side water temperature Twi of the heat source water supplied to each of the heat source machines 1A-1C and an inlet-side water pressure sensor 20 that measures an inlet-side water pressure Pwi of the heat source water supplied to the heat source machine 1.

In the vicinity of a heat source water outlet of the water heat exchanger 16 in each of the heat source machines 1A-1C, there are provided an outlet-side water temperature sensor 21 that measures an outlet-side water temperature Twe of the heat source water coming from each of the heat source machines 1A-1C and supplied to the load facility side B and an outlet-side water pressure sensor 22 that measures an outlet-side water pressure Pwe of the heat source water coming from each of the heat source machines 1A-1C and supplied to the load facility side.

Each of the heat source machines 1A-1C is equipped with the heat source machine control device 10 that drive-controls the four way valve 13, the electric expansion valve 15, the compressor 11, and the fan 17. The heat source machine control device 10 is connected to various sensors 19-22.

In response to instructions from the heat source controller 3, each of the heat source machine control devices 10 operates each of the heat source machines 1A-1B so that the outlet-side water temperature Twe in each of the heat source machines 1A-1C is equal to a preset target temperature T.

Although three heat source machines 1 are connected in parallel in FIG. 1, any number of the heat source machines 1 may be connected.

In each of the heat source machines 1A-1C configured in the manner mentioned above, a refrigerant flows in a direction shown with a solid arrow in FIG. 2 at the time of cooling operation (at the time of cold water generation). The refrigerant compressed in the compressor 11 passes the four way valve 13, the air heat exchanger 14, the electric expansion valve 15, and the water heat exchanger 16 in sequence, and returns to the compressor 11 also via the four way valve 13. In this case, the air heat exchanger 14 functions as a condenser, while the water heat exchanger 16 functions as an evaporator. In the water heat exchanger 16, the refrigerant exchanges heat with the heat source water sent by the primary pump 2 to thereby cool the heat source water.

On the other hand, at the time of heating operation (at the time of warm water generation), the four way valve 13 is switched, so that the refrigerant flows in a direction shown with a dashed arrow line in FIG. 2. The refrigerant compressed in the compressor 11 passes the four way valve 13, the water heat exchanger 16, the electric expansion valve 15, and the air heat exchanger 14 in sequence, and returns to the compressor 11 also via the four way valve 13. During such operation, the air heat exchanger 14 functions as an evaporator, while the water heat exchanger 16 functions as a condenser. In the water heat exchanger 16, the refrigerant exchanges heat with the heat source water sent by the primary pump 2 to thereby heat the heat source water.

Thus, each of the heat source machines 1A-1C can generate cold water for cooling/chilling and can generate warm water for warming/heating.

As shown in FIG. 1, the heat source water generated in each of the heat source machines 1A-1C is supplied to the load facility side B through the delivery pipe 4 having one end connected to a heat source water outlet of each of the heat source machines 1A-1C. The delivery pipe 4 is further connected to a secondary pump (load side pump) 5 so as to deliver the heat source water to the load facility side B.

The secondary pump 5 is driven at variable speed by a secondary pump inverter 51 so that a flow rate of the heat source water supplied to the load facility side B is controlled. An output (flow rate) of the secondary pump 5 is controlled corresponding to a cooling/heating capacity required by the load facility side B and regardless of operation of the heat source machine side A.

The heat source water, which is made to exchange heat with air in an air-conditioned room in a fan coil 6 (6A, 6B) on the load facility side B, flows through a return pipe 8 via a two way valve 7 connected to an outlet side of the fan coil 6, and is sent to the primary pump 2 of the heat source machine side A.

Although two fan coils 6 are connected in parallel in FIG. 1, any number of the fan coils 6 may be connected.

A bypass pipe 9 connecting the delivery pipe 4 and the return pipe 8 is provided between the heat source machine side A and the load facility side B. As described above, since the flow rate of the secondary pump 5 is controlled regardless of the operation of the heat source machine side A, an amount of the heat source water flowing through the heat source machine side A and an amount of the heat source water flowing through the load facility side B may be unbalanced. When they are unbalanced, heat source water flows through the bypass pipe 9, by which the amount of the heat source water flowing through the heat source machine side A and the amount of the heat source water flowing through the load facility side B are balanced.

The delivery pipe 4 is equipped with a delivery temperature sensor 41 for detecting a delivery temperature TwS of the heat source water flowing through the delivery pipe 4. The return pipe 8 is equipped with a return temperature sensor 81 for detecting a return temperature TwR of the heat source water inside the return pipe 8.

As shown in FIG. 2, temperature information measured in the heat source machine inlet-side water temperature sensor 19, the heat source machine inlet-side water pressure sensor 20, the heat source machine outlet-side water temperature sensor 21, and the heat source machine outlet-side water pressure sensor 22 in each of the heat source machines 1A-1C is collected into the heat source controller 3 via the heat source machine control device 10 in each of the heat source machines 1A-1C.

As shown in FIG. 1, the load facility side B is also connected to the heat source controller 3, so that temperature information of the delivery temperature sensor 41 and the return temperature sensor 81 is also collected into the heat source controller 3. Although not particularly shown in the drawing, the load side information from the load facility side B is also inputted into the heat source controller 3.

The heat source controller 3 determines the operating conditions of each of the heat source machines 1A-1C in accordance with various temperature information and load facility side information. The heat source controller 3 then reports the determined operating conditions to each of the heat source machines 1A-1C. The heat source machine control device 10 in each of the heat source machines 1A-1C drives the compressor 11, the four way valve 13, the electric expansion valve 15, the fan 17, the primary pump 2 and the like in each of their machines according to the operating conditions reported from the heat source controller 3.

Further, with reference to FIGS. 1 and 2, although the heat source controller 3 is placed outside the heat source machines 1A-1C, it may be accommodated in any one of the heat source machines 1A-1C.

The heat source controller 3 is provided with the following units (1) to (3) for achieving main functions.

(1) A temperature difference calculation unit that obtains, from the heat source machine control device 10 in each of the heat source machines 1A-1C, an inlet-side temperature Twi and an outlet-side temperature Twe of heat source water and calculates a temperature difference $\Delta T$ ($\Delta T=|Twi-Twe|$) between the inlet-side water temperature Twi and the outlet-side water temperature Twe.

(2) A water feed determination unit that compares the temperature difference $\Delta T$ with a set value TS prestored in the heat source controller 3 and determines whether or not the heat source water is normally fed by the primary pump 2.

(3) A cold/warm water generation unit that operates the refrigeration cycle R of the heat source machine 1 which is determined by the water feed determination unit so that the water feed by the primary pump 2 is normal, thereby generating the cold water or warm water.

Figure 3:
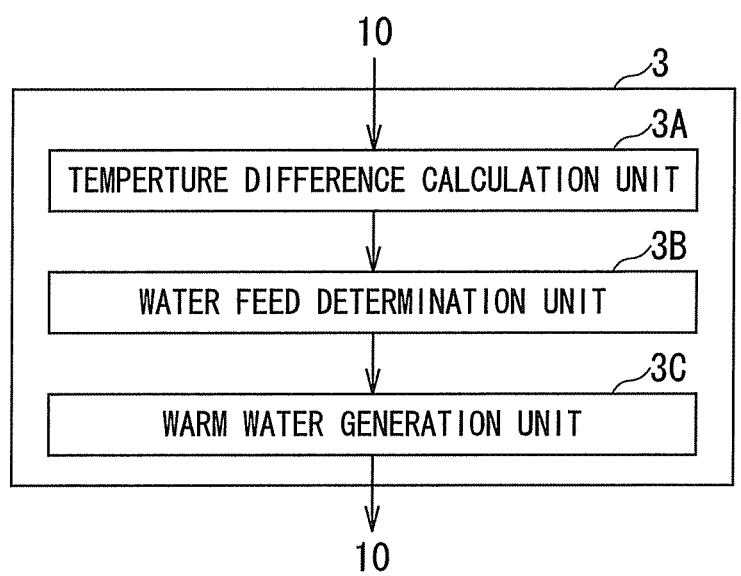
FIG. 3 is a schematic diagram showing functional units of a heat source controller in the heat source apparatus.

In short, the heat source controller 3 includes, as shown in FIG. 3, a temperature difference calculation unit 3A, a water feed determination unit 3B, and a cold/warm water generation unit 3C which will be described hereinlater.

Information (signals) from the heat source machine, i.e., an inlet-side temperature Twi and an outlet-side temperature Twe of the heat source water from the heat source machine control device 10, are obtained (inputted), and thereafter, a temperature difference $\Delta T$ ($\Delta T=|Twi-Twe|$) between the inlet-side water temperature Twi and the outlet-side water temperature Twe is calculated in the temperature difference calculation unit 3A.

The calculated temperature difference $\Delta T$ is sent to the water feed determination unit 3B and is compared with a set value TS prestored in the heat source controller 3 to determine whether or not the heat source water is normally fed by the primary pump 2. In this regard, it may be said that the water feed determination unit 3B has a comparison function and a determination function. It is to be noted that the prestored set value may be provided in the water feed determination unit 3B as a functional unit, or it may be connected to the heat source controller 3 as an externally provided unit.

Further, the water feed determination unit 3B is connected to the cold/warm water generation unit 3C, which operates a refrigeration cycle R of a heat source machine 1, which is determined by the water feed determination unit 3B to have normal water feed by the primary pump 2 to thereby generate cold water or warm water. Information from the cold/warm water generation unit 3C is returned to the heat source machine control device 10. These operations are performed by inputting/outputting signals between respective units.

Figure 4:
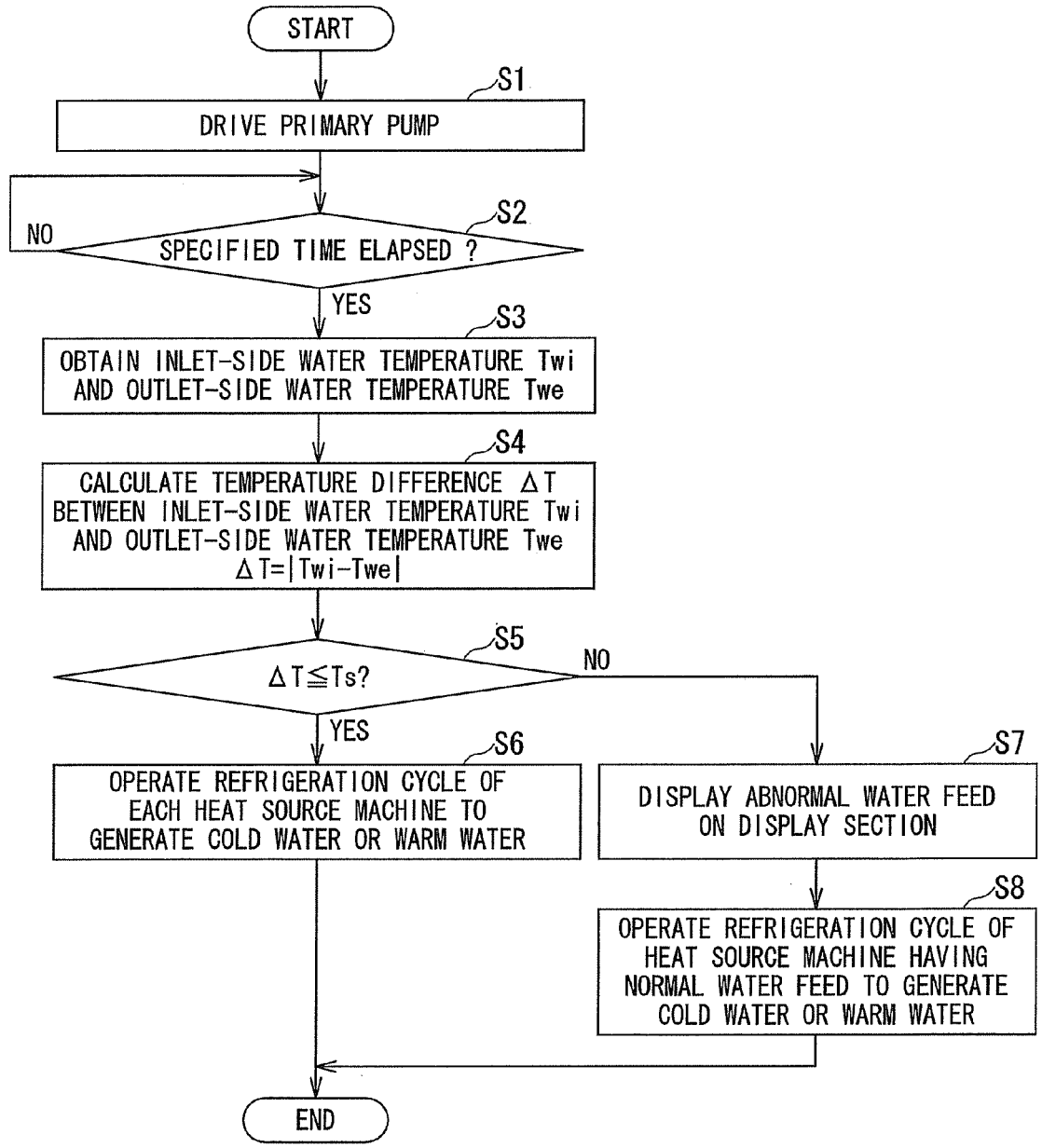
FIG. 4 is a flowchart showing operation of the heat source system according to the embodiment.

A description is now given of operation of the heat source system S as described in the foregoing with reference to FIG. 4.

FIG. 4 is a flow chart of processing executed by the heat source controller 3 and the heat source machine control device 10 in each of the heat source machines 1A-1C.

When an operator operates an operating section provided on the load facility side B or an operating section provided in the heat source controller 3, or when start of operation is instructed according to a driving schedule set in the heat source controller 3, the respective heat source machine control devices 10 first drive, in response to a command of the heat source controller 3, the primary pumps 2A-2C at a prescribed frequency via primary pump inverters 23 in the respective heat source machines 1A-1C (step S1).

After elapse of specified time (Yes in step S2), the heat source controller 3 obtains from each of the heat source machine control device 10 an inlet-side water temperature Twi and an outlet-side water temperature Twe of each of the heat source machines 1A-1C (step S3).

Next, the heat source controller 3 calculates a temperature difference $\Delta T$ ($\Delta T=|Twi-Twe|$) between the inlet-side water temperature Twi and the outlet-side water temperature Twe of each of the heat source machines 1A-1C which have been obtained in the processing of the step S3 (step S4).

Next, the heat source controller 3 compares a set value Ts prestored in the heat source controller 3 (e.g., Ts=2° C.) with the value $\Delta T$ of each of the heat source machines 1A-1C calculated in the processing of the step S4 (Step S5).

Here, since the refrigeration cycle R in each of the heat source machines 1A-1C is not in operation, the heat source water does not have any temperature change before and after passing the water heat exchanger 16. However, if the heat source water does not normally flow by such causes as accumulation of air at the time when each of the primary pumps 2A-2C is driven, the heat generated by each of the primary pumps 2A-2C transmits to the inlet-side water temperature sensor 19 positioned downstream from each of the primary pumps 2A-2C, and then, the inlet-side water temperature Twi detected by the inlet-side water temperature sensor 19 becomes higher than the outlet-side water temperature Twe detected by the outlet-side water temperature sensor 21.

If the flow rate of the heat source water is quite low due to such causes as partial freezing inside the water heat exchanger 16 at the time when each of the primary pumps 2A-2C is driven, the heat of the heat source water, which is cooled by flowing through the freezing portion, transmits to the outlet-side water temperature sensor 21, and then, the outlet-side water temperature Twe detected by the outlet-side water temperature sensor 21 becomes lower than the inlet-side water temperature Twi detected by the inlet-side water temperature sensor 19.

That is, when the water feed by the respective primary pumps 2A-2C has any sort of failures, a temperature difference $\Delta T$ is generated between the inlet-side water temperature Twi and the outlet-side water temperature Twe. If the value $\Delta T$ is larger than the set value Ts, it can be determined that water feed by the respective primary pumps 2A-2C has abnormalities.

On the contrary, if the temperature difference $\Delta T$ between the inlet-side water temperature Twi and the outlet-side water temperature Twe is equal to or less than the set value Ts, it can be determined that water feed by the respective primary pumps 2A-2C is normal.

Therefore, when the temperature difference $\Delta T$ in each of the heat source machines 1A-1C is equal to or less than the set value Ts in the step S5 (Yes in step S5), the heat source controller 3 determines that the heat source water is normally fed by the respective primary pumps 2A-2C, and operates the refrigeration cycle R in each of the heat source machines 1A-1C to start generation of cold water or warm water (step S6).

When the temperature difference $\Delta T$ in each of the heat source machines 1A-1C is larger than the set value Ts (No in step S5), the heat source controller 3 determines that heat source water is not normally fed by the respective primary pumps 2A-2C, makes a displaying unit provided in the heat source controller 3 display information on a heat source machine which has abnormal water feed (step S7), and withholds the operation of the refrigeration cycle R in the heat source machine having abnormal water feed.

The heat source controller 3 operates the refrigeration cycle R of the heat source machines having normal water feed so as to start the generation of the cold water or warm water (step S8).

As described above, since operation of the refrigeration cycle R is withheld in the heat source machine that has abnormal water feed, the heat source apparatus in the present embodiment can grasp a water feed state by the respective primary pumps 2A-2C without installation of an expensive flowmeter, and can prevent the water heat exchanger 16 from freezing, bursting and the like.

In the disclosed embodiment, the water feed state by each of the primary pumps 2A-2C has been determined by the temperature difference $\Delta T$ between the inlet-side water temperature Twi detected by the inlet-side water temperature sensor 19 and the outlet-side water temperature Twe detected by the outlet-side water temperature sensor 21.

However, the water feed state by each of the primary pumps 2A-2C may be determined instead by using a pressure difference $\Delta P$ (pressure loss) between an inlet-side water pressure Pwi detected by the inlet-side water pressure sensor 20 and the outlet-side water pressure Pwe detected by an outlet-side water pressure sensor 22.

More specifically, by applying a pressure loss $\Delta P$, which is calculated from the inlet-side water pressure Pwi detected by the inlet-side water pressure sensor 20 and the outlet-side water pressure Pwe detected by the outlet-side water pressure sensor 22 in each of the heat source machines 1A-1C, to a table that associates the flow rate and the pressure loss $\Delta P$ in the water heat exchanger 16 that are prestored in the heat source controller 3, a flow rate Q of the heat source water flowing through the water heat exchanger 16 in each of the heat source machines 1A-1C can be estimated, and the water feed state by each of the primary pumps 2A-2C can be determined depending on whether or not the estimated flow rate Q is a specified flow rate or more.

The water feed by each of the primary pumps 2A-2C may also be determined to be normal if an outlet-side water pressure Pwe, which is detected by the outlet-side water pressure sensor 22 in each of the heat source machines 1A-1C before activation of the respective primary pumps 2A-2C, is detected to be increased by a specified value or more after activation.

In the case where the heat source controller 3 controls the number of the heat source machines 1 in operation depending on the load on the load facility side B, an outlet-side water pressure Pwe detected by a heat source machine which has already been operated for generating the cold water or warm water (a mean value when two or more heat source machines have already been activated) may be compared with an outlet-side water pressure Pwe detected by a heat source machine having the primary pump newly activated in response to a command from the heat source controller 3 to increase the number of machines in operation, and if a difference therebetween is within a specified range, it can be determined that water feed is normally performed in the heat source machine whose primary pump has been newly activated.

Moreover, an inlet-side water temperature Twi detected by a heat source machine which is already in operation for generation of cold water or warm water (a mean value when two or more heat source machines have already been activated) may be compared with an inlet-side water temperature Twi detected by a heat source machine having the primary pump newly activated in response to a command from the heat source controller 3 to increase the number of machines in operation, and if a difference therebetween is within a specified range, it can be determined that water feed is normally performed in the heat source machine of which primary pump has been newly activated.

In addition to the above matters or operations, it should be understood that the present embodiment is in all respects illustrative and is not intended to limit the technical scope of the present invention. The described novel embodiments can be performed in other various forms, various kinds of removals, replacements and modifications may be possible without departing from the spirit of the present invention. These embodiments and their modifications are intended to be embraced in the range and meaning of the present invention, and are intended to be embraced in the invention disclosed in the range of the claims and the equivalency thereof.

REFERENCE NUMERAL

S—heat source system,
A—heat source machine side,
B—load facility side,
1A-1C—heat source machine,
2A-2C—primary pump,
3—heat source controller,
10—heat source machine controller,
19—heat source machine inlet-side temperature sensor, 20—heat source machine inlet-side water pressure sensor,
21—heat source machine outlet-side temperature sensor,
22—heat source machine outlet-side water pressure sensor.

The invention claimed is:

1. A heat source apparatus of a heat source system made up of a heat source machine side and a load facility side, the heat source apparatus comprising:
   a heat source machine; and
   a heat source controller,
   wherein the heat source machine includes: a water heat exchanger that exchanges heat between heat source water and a refrigerant circulating through a refrigeration cycle; a primary pump that delivers heat source water to the water heat exchanger; and a heat source machine control device that operates based on information from the water heat exchanger and the primary pump, and
   wherein the heat source controller is connected to the heat source machine control device on a heat source side and to the load facility side so as to determine, after the primary pump is activated, whether or not the heat source water is normally fed by the primary pump based on a temperature difference between the heat source water before and after the water heat exchanger or a pressure difference between the heat source water before and after the water heat exchanger, and so as to then operate the refrigeration cycle after normal water feed is confirmed through water feed determination.

2. The heat source apparatus according to claim 1, wherein the heat source controller includes: a temperature difference calculation unit that obtains an inlet-side temperature and an outlet-side temperature of the heat source water from the heat source machine control device of the heat source machine and calculates a temperature difference therebetween; a water feed determination unit that compares the temperature difference with a set value prestored in the heat source controller and determines whether or not the heat source water is normally fed by the primary pump; and a cold/warm water generation unit that operates a refrigeration cycle of the heat source machine, which is determined by the water feed determination unit to have normal water feed by the primary pump, so as to generate cold water or warm water.

3. The heat source apparatus according to claim 2, wherein the heat source machine includes: an inlet-side water temperature sensor that detects water temperature at a heat source water inlet side of the water heat exchanger; and an outlet-side water temperature sensor that detects water temperature at a heat source water outlet side of the water heat exchanger, and wherein the heat source machine control device permits operation of the refrigeration cycle when a temperature difference between the inlet-side water temperature and the outlet-side water temperature is within a specified range.

4. The heat source apparatus according to claim 2, wherein the heat source machine includes: an inlet-side water pressure sensor that detects water pressure at the heat source water inlet side of the water heat exchanger; and an outlet-side water pressure sensor that detects water pressure at the heat source water outlet side of the water heat exchanger, and wherein the heat source machine control device calculates a pressure loss from the inlet-side water pressure and the outlet-side water pressure, estimates a flow rate of the primary pump based on a table that associates a prestored flow rate and pressure loss of the water heat exchanger, and permits operation of the refrigeration cycle if the estimated flow rate is equal to or more than a specified value.

* * * * *